US009170726B2

United States Patent
Kooh et al.

(10) Patent No.: US 9,170,726 B2
(45) Date of Patent: Oct. 27, 2015

(54) APPARATUS AND METHOD FOR PROVIDING GUI INTERACTING ACCORDING TO RECOGNIZED USER APPROACH

(75) Inventors: Sung-wook Kooh, Seoul (KR); Jae-hwan Kim, Seongnam-si (KR); Seong-il Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 917 days.

(21) Appl. No.: 12/768,373

(22) Filed: Apr. 27, 2010

(65) Prior Publication Data
US 2011/0043463 A1 Feb. 24, 2011

(30) Foreign Application Priority Data
Aug. 24, 2009 (KR) .................. 10-2009-0078364

(51) Int. Cl.
*G06F 3/041* (2006.01)
*G06F 3/0488* (2013.01)
*G06F 3/0482* (2013.01)
*G06F 3/0484* (2013.01)

(52) U.S. Cl.
CPC ............ *G06F 3/0488* (2013.01); *G06F 3/0482* (2013.01); *G06F 3/04842* (2013.01); *G06F 3/04845* (2013.01); *G06F 2203/014* (2013.01)

(58) Field of Classification Search
CPC ..... G06F 3/041; G06F 3/0412; G06F 3/0481; G06F 3/0482; G06F 3/0488; G06F 2203/04101; G06F 2203/04108; G06F 2203/04808

USPC ........ 345/173–178; 178/18.06; 715/700, 862, 715/864, 763–764
See application file for complete search history.

(56) References Cited

U.S. PATENT DOCUMENTS

| | | | | |
|---|---|---|---|---|
| 5,119,079 A | * | 6/1992 | Hube et al. | 715/823 |
| 5,565,888 A | * | 10/1996 | Selker | 715/823 |
| 5,736,974 A | * | 4/1998 | Selker | 715/862 |
| 5,956,035 A | * | 9/1999 | Sciammarella et al. | 715/815 |
| 6,211,856 B1 | * | 4/2001 | Choi et al. | 345/666 |
| 7,002,556 B2 | * | 2/2006 | Tsukada et al. | 345/173 |
| 7,158,123 B2 | * | 1/2007 | Myers et al. | 345/173 |
| 7,482,943 B2 | | 1/2009 | Beuk et al. | |
| 7,844,921 B2 | * | 11/2010 | Ike et al. | 715/863 |
| 7,956,847 B2 | * | 6/2011 | Christie | 345/173 |
| 8,164,577 B2 | * | 4/2012 | Tsuzaki et al. | 345/173 |

(Continued)

FOREIGN PATENT DOCUMENTS

| | | | |
|---|---|---|---|
| JP | 2008282092 A | * | 11/2008 |
| JP | 2009116583 A | | 5/2009 |

(Continued)

OTHER PUBLICATIONS

Machine Translation of JP-2008-282092.*

(Continued)

*Primary Examiner* — Jason Mandeville
(74) *Attorney, Agent, or Firm* — Sughrue Mion, PLLC

(57) ABSTRACT

An interface controlling method and an apparatus thereof are provided to control a user interface based on a proximity sensor and a touch pad. A number of items are displayed, an item approached by a user is identified by sensing an approach, information is provided regarding the identified item, contact by the user is sensed, and a function corresponding to the user contact is performed.

17 Claims, 4 Drawing Sheets

(56) References Cited

U.S. PATENT DOCUMENTS

| | | |
|---|---|---|
| 8,219,936 B2 * | 7/2012 | Kim et al. .................. 715/862 |
| 8,413,075 B2 * | 4/2013 | Ording et al. ............... 715/863 |
| 8,933,892 B2 * | 1/2015 | Woolley et al. .............. 345/173 |
| 2006/0001548 A1 | 1/2006 | Beuk et al. |
| 2006/0161871 A1 | 7/2006 | Hotelling et al. |
| 2007/0177803 A1 * | 8/2007 | Elias et al. .................. 382/188 |
| 2008/0094367 A1 * | 4/2008 | Van De Ven et al. ......... 345/173 |
| 2008/0297484 A1 | 12/2008 | Park et al. |
| 2009/0058829 A1 * | 3/2009 | Kim et al. .................... 345/173 |
| 2009/0122007 A1 | 5/2009 | Tsuzaki et al. |
| 2009/0178011 A1 * | 7/2009 | Ording et al. ................ 715/863 |
| 2009/0219255 A1 * | 9/2009 | Woolley et al. .............. 345/173 |
| 2009/0239588 A1 * | 9/2009 | Nam ............................ 455/566 |
| 2011/0022307 A1 * | 1/2011 | Lee .............................. 701/202 |

FOREIGN PATENT DOCUMENTS

| | | |
|---|---|---|
| KR | 100282099 B1 | 2/2001 |
| KR | 1020040038013 A | 5/2004 |
| KR | 1020080104858 A | 12/2008 |
| KR | 10-2009-0017828 A | 2/2009 |
| WO | 2009/028892 A2 | 3/2009 |

OTHER PUBLICATIONS

English Language Translation of JP-2008-282092.*
Communication dated May 20, 2014 issued by the European Patent Office in counterpart European Patent Application No. 10161507.8.
Communication dated Aug. 19, 2015, issued by the Korean Intellectual Property Office in counterpart Korean Application No. 10-2009-0078364.

* cited by examiner

APPARATUS AND METHOD FOR PROVIDING GUI INTERACTING ACCORDING TO RECOGNIZED USER APPROACH

CROSS-REFERENCE TO RELATED PATENT APPLICATIONS

This application claims the benefit of Korean Patent Application No. 2009-78364, filed in the Korean Intellectual Property Office on Aug. 24, 2009, the disclosure of which is incorporated herein by reference.

BACKGROUND

1. Field of the Invention

Exemplary embodiments described herein relate to a method and apparatus for controlling interface, and more particularly, to a method and apparatus for controlling user interface based on a proximity sensor and touch pad method.

2. Description of the Related Art

Recently, display apparatuses such as TVs, electronic boards, large format displays (LFDs) and table tops have been given touch screens. If a user touches the touch screen, an image or an icon on the screen is selected or executed. However, if there are a plurality of items on the screen, a user must touch and execute each item to obtain information regarding each item and to figure out how each of items should be executed. This may require a lot of work from the user and thus undermine usability.

SUMMARY

Aspects of the present invention relate to a method and apparatus for providing a graphical user interface (GUI) which provides a user with information regarding items accessed by the user from among items on a touch screen.

A method for providing a GUI, according to an exemplary embodiment comprises displaying a plurality of items, sensing an approach to a display screen by a user and identifying an item approached by the user, providing information regarding the identified item, sensing a contact of the display screen by the user, and performing a function corresponding to the user contact.

The providing information regarding the identified item may further comprise providing information regarding a function corresponding to the user contact, with regard to the item approached by the user.

The providing information regarding a function corresponding to the user contact may provide information regarding a function which can be performed in response to the user contact, with regard to the item approached by the user.

The providing information regarding a function corresponding to the user contact may provide a symbol indicating an operation which can be performed by the user contact operation.

The providing information regarding a function corresponding to the user contact may provide the information as an animation.

The method may further comprise removing the information regarding the identified item if the user contact is not sensed for a predetermined period of time.

The providing information regarding the identified item may further comprise changing a size of information regarding the item according to a distance from the user to the item.

The sensing contact by the user may further comprise sensing a type of user contact and determining a user command corresponding to the user contact, and the performing a function corresponding to the user contact may further comprise performing a function corresponding to the determined user command.

The sensing the type of user contact may comprise identifying a path of contact by the user and identifying a command to execute a function corresponding to the identified path of contact.

The performing a function corresponding to the user contact may further comprise performing a function corresponding to a determined user command with regard to the identified item.

The approach and contact by a user may be approach and contact by part of the user's body or a subject of the user.

A display apparatus, according to an exemplary embodiment comprises a display unit which displays a plurality of items, a proximity sensor unit which senses an approach to the display unit by a user, a touch sensor unit that senses a contact of the display unit by the user, and a control unit which identifies one item of the plurality of items by analyzing an approached point on the display unit sensed by the proximity sensor unit, displays information regarding the one item on the display unit, and performs a function corresponding to the user contact sensed by the touch sensor unit.

The control unit may control the display unit to display information regarding a function corresponding to the user contact and information regarding an input method of the user contact as information regarding the one item.

The control unit may control the display unit to remove the information on the display unit corresponding to the one item based on no user contact being sensed for a predetermined period of time.

The control unit may control the display unit to change a size of the information on the display unit corresponding to the one item according to a distance from a user to the one item.

The control unit may control the display unit to remove the information on the display unit corresponding to the one item based on a user contact being sensed through the touch sensor unit.

The control unit may control the display unit to display information regarding a function that can be performed corresponding to the one item.

The control unit may control the display unit to display a symbol indicating an operation corresponding to the user contact.

The control unit may control the display unit to display information as an animation.

The touch sensor unit may transmit information regarding a type of user contact to the control unit, and the control unit may perform the user command corresponding to the type of user contact based on the user command being associated with the one item.

BRIEF DESCRIPTION OF THE DRAWINGS

These and/or other exemplary aspects and advantages will become apparent and more readily appreciated from the following description, taken in conjunction with the accompanying drawings, of which.

DETAILED DESCRIPTION OF EXEMPLARY EMBODIMENTS

Figure 1:
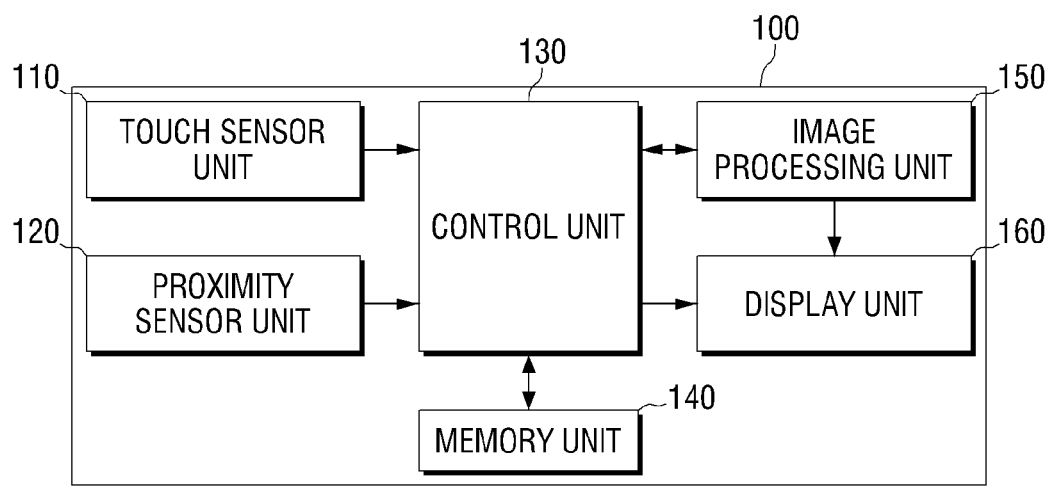
FIG. 1 is a view illustrating an exemplary electronic apparatus.

Reference will now be made in detail to exemplary embodiments, examples of which are illustrated in the accompanying drawings, wherein like reference numerals refer to like elements throughout. Embodiments are described below by referring to the figures.

FIG. 1 is a view illustrating the structure of an interface controlling apparatus according to an exemplary embodiment. Referring to FIG. 1, the interface controlling apparatus 100 comprises a touch sensor unit 110, a proximity sensor unit 120, a control unit 130, a memory unit 140, an image processing unit 150, and a display unit 160.

The touch sensor unit 110 which senses touch on the display unit 160 identifies a location through contact of a finger, or the palm of the hand, and resistance type, capacitive type, and infrared ray type may be applied. In the capacitive type, sensors sensing touch are crossed horizontally and vertically, voltage is applied at a predetermined interval, and electric current flows as electric charge is induced. Since a human finger draws electric charge, if the finger contacts a cross point, electric current is reduced as much as the reduced electric charge. Accordingly, the contact point can be recognized. In this case, the electric current that flows through the sensor changes depending on the intensity of contact. For instance, if electric current is not reduced by the contact, the electric current is a maximum value, and the value of the electric current is reduced gradually according to the degree of the contact and approach. That is, if the change of electric current is measured, the pressure applied by the human contact can also be measured. In this case, if the voltage of the sensor is raised beyond a certain level, even approach within a certain distance before contacting the sensor can be sensed. The proximity sensor unit 120 may be realized through the above method, or may be realized through other methods which use heat, light, electric waves, ultrasonic waves, or infrared rays.

The memory unit 140 may store information regarding a plurality of operations performed by each item controlled by a user, information regarding gestures which execute each operation, and information regarding an approached subject when a user approach signal is received from the proximity sensor unit 120.

The image processing unit 150 transmits an image signal so that the display unit 160 displays an item controlled by a user and information regarding the item.

The display unit 160 receives an image signal from the image processing unit 150 and displays it on a screen. The display unit 160 may be realized as a liquid crystal display (LCD), a plasma display panel (PDP), a projection display, a digital light processing (DLP) display, or an organic light emitting diode (OLED) display.

The control unit 130 controls the image processing unit 150 to display more than one item, and identifies an item approached by a user using proximity information if user approach information is received through the proximity sensor unit 120.

If a user touch is sensed through the touch sensor unit 110, the control unit 130 recognizes the user touch information, identifies a command corresponding to the touch information through touch information stored in the memory unit 140 and a corresponding command table, and executes the command. For instance, if a touch point is moved from one point to an opposite point in the case of multi-touch, the touch sensor unit 110 transmits the touch information to the control unit 130, and the control unit 130 interprets the touch information received from the touch sensor unit 110 as magnifying and displaying a corresponding item based on the command table regarding the touch information in the memory unit 140. The control unit 130 controls the display unit 160 to display the magnified image of the corresponding item. The item may be defined not only to be magnified but also to be rotated. For instance, if a touch point is moved in a circle while being touched, the control unit 130 receives the information regarding the movement of the touch point from the touch sensor unit 110, interprets the information as rotating the item based on the command table regarding the touch information in the memory unit 140, and controls the display unit 160 to rotate and display the corresponding item. The detailed example regarding this will be explained later with reference to FIG. 2 to FIG. 7.

The display unit 160 is an apparatus to output an image on a screen under the control of the control unit 130.

Figure 2:
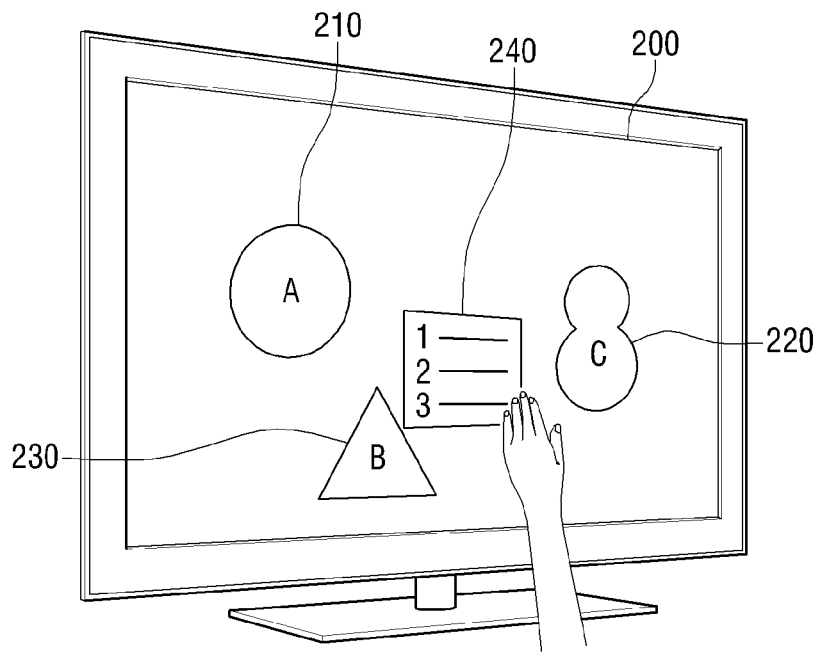
FIG. 2 is a view illustrating an exemplary GUI in which item information is displayed in the vicinity of an item when a user approaches the on a touch LCD screen.

FIG. 2 is a view illustrating an example of providing item information regarding an item approached by a user. A plurality of items 210, 220, 230 are displayed on a screen 200, and if the user approaches one of the plurality of items 210, 220, 230, the control unit 130 identifies the approached item through the proximity sensor unit 120 and displays information regarding the corresponding item 240.

The information regarding the corresponding item 240 may be information regarding a location of the item, a title, a file name, a file type, functions of the item, or user commands to perform functions.

Figure 3:
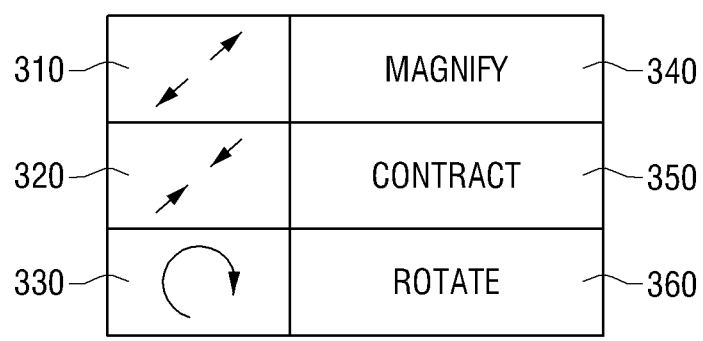
FIG. 3 is a view illustrating exemplary operation information of an item which is displayed in the vicinity of the item after user approach is sensed.

FIG. 3 is a view illustrating an example of item information. FIG. 3 illustrates that if the item is an image, the image may be magnified, reduced, or rotated. A magnification command 340 may be executed on an item if a touch is input in the outward direction as indicated by two arrows 310, or a contraction command 350 may be executed on an item if a touch is input in the inward direction as indicated by two arrows 320. In addition, a rotation 360 may be performed on an item if a touch is input in a circular direction as indicated by a round arrow 330.

Figure 4:
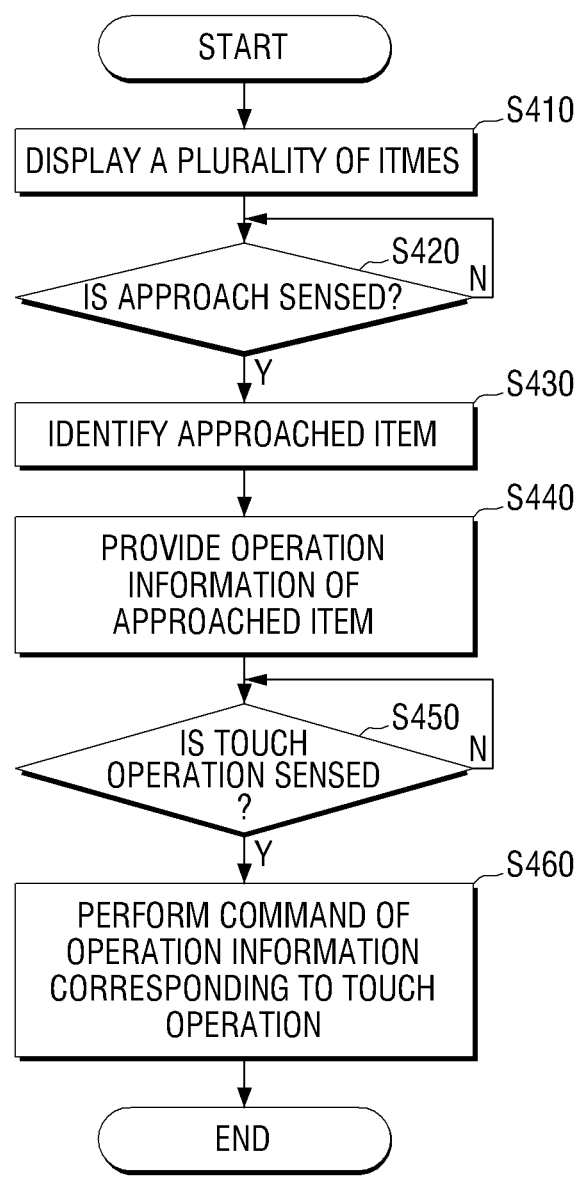
FIG. 4 and FIG. 5 are flow charts of GUI methods according to exemplary embodiments.

FIG. 4 illustrates a flow chart of a method of controlling a user interface according to an exemplary embodiment. Referring to FIG. 4, the display unit 160 displays a plurality of items on a screen under the control of the control unit 130 (S410).

Data to be displayed may include an image or a screen including text, and part of the data may be displayed on the screen while other data remains hidden. For instance, only an upper part of the data may be displayed on the screen while the lower part of the data may be hidden.

If an object or a person approaches (S420-Y), the proximity sensor unit 120 detects the approached point. The control unit 130 identifies the approached item from among items displayed on the screen through information regarding the approached point received from the proximity sensor unit 120 (S430).

If the control unit 130 identifies the approached item, the control unit 130 reads out operation information regarding the item from the memory unit 140 and displays it to show information regarding the approached item (S440).

If contact on the screen (a touch) is sensed (S450-Y), the touch sensor unit 110 transmits the information regarding the contact (the touch and move operation) to the control unit 130, and the control unit 130 executes a command corresponding to the information (S460).

Figure 5:
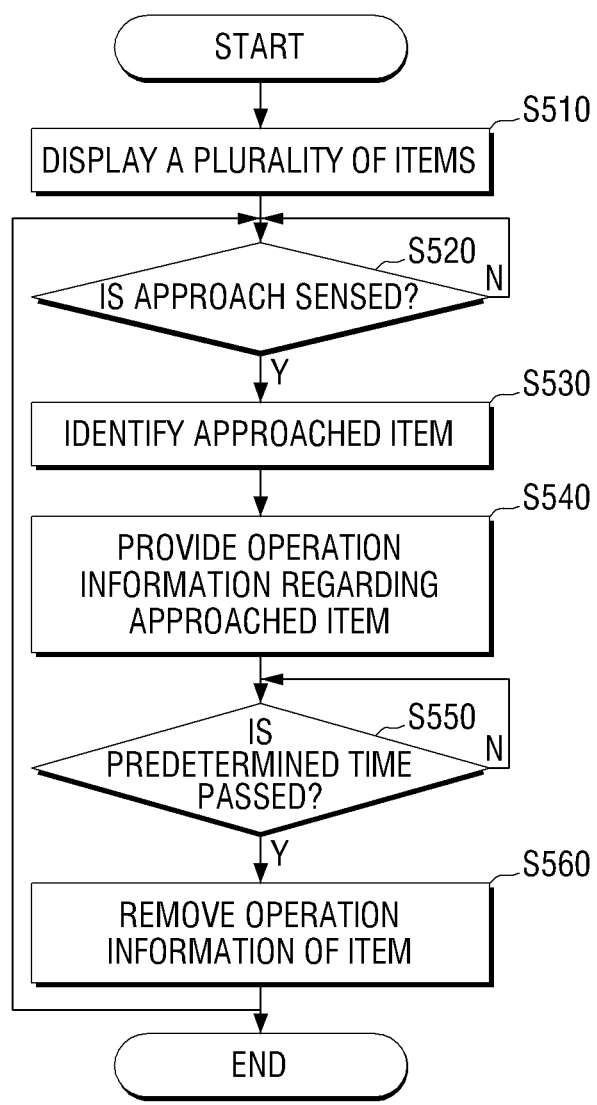

FIG. 5 illustrates a flow chart of a method of controlling an interface according to another exemplary embodiment. Referring to FIG. 5, the display unit 160 displays a plurality of items on a screen under the control of the control unit 130 (S510).

Data to be displayed may include an image or a screen including text, and part of the data may be displayed on the screen while other data remains hidden. For instance, only an upper part of the data may be displayed on the screen while the lower part of the data may be hidden.

If an object or a person approaches (S520-Y), the proximity sensor unit 120 detects the approached point. The control unit 130 identifies the approached item from among items displayed on the screen through information regarding the approached point received from the proximity sensor unit 120 (S530).

If the control unit 130 identifies the approached item, the control unit 130 reads out operation information regarding the item from the memory unit 140 and displays it to show information regarding the approached item (S540).

If a predetermined time elapses without any contact on the screen (S550-Y), it is determined that there is no additional input by a user regarding the item, and operation information regarding the item is removed from the screen (S560).

In the above description, exemplary embodiments have been described.

The information regarding the items in the above examples may be provided in other ways such as, but not limited to, animations, text, or arrows.

In addition, a display size of information regarding an item may change depending on a distance from a user to the displayed item.

In order to recognize a user command input through contact (touch), the control unit 130 may analyze a contact track by the user and recognize a command corresponding to the contact track by the use as the user command.

With respect to an exemplary embodiment, it has been described that information regarding an item may be removed if user contact is not sensed for a predetermined period of time. However, alternately, the information regarding an item may be configured to be removed after user contact is sensed, or may be removed based on another trigger.

An interface controlling apparatus according to exemplary embodiments could be any one of a number of apparatuses as would be understood by one of skill in the art. Exemplary embodiments may be applied not only to a TV which is a mounted display apparatus, but also to a mobile phone, a PMP, an MP3 player, or the like, which are portable apparatuses.

As in the above description, according to exemplary embodiments, as a user is able to view information regarding an item before directly contacting the item, the number of manipulations by the user may thus be reduced, and faulty manipulation and faulty operation may be prevented. Consequently, a GUI with higher usability may be provided.

Although exemplary embodiments have been shown and described, it would be appreciated by those skilled in the art that changes may be made without departing from the principles and spirit of the invention, the scope of which is defined in the claims and their equivalents.

What is claimed is:

1. A method for providing a graphical user interface, the method comprising:
   displaying a plurality of items on a display screen;
   sensing an approach to the display screen by a user and identifying one item approached by the user from the plurality of items;
   in response to the identifying the one item, displaying information regarding different types of user touch comprising at least two of magnifying, reducing and rotating, wherein the different types of user touch control the identified one item, the information is displayed in a size determined based on a distance of the user to the identified one item and the size of the information is changed based on the distance of the user to the identified one item while the information is displayed;
   sensing a type of user touch input by the user to the identified one item; and
   performing a function comprising at least one of magnifying, reducing, and rotating the item corresponding to the sensed type of user touch among the different types of user touch.

2. The method as claimed in claim 1, wherein the displayed information further comprises information regarding an action to be performed on the identified one item by each of the different types of user touch input.

3. The method as claimed in claim 1, wherein the identified item is an image, and wherein the different types of the user touch comprise at least gestures of said magnifying, said reducing and said rotating the image.

4. The method as claimed in claim 2, wherein the different types of the user touch comprise a symbol representing a form of each of the different types of user touch input.

5. The method as claimed in claim 2, wherein the information regarding the action is presented by animation.

6. The method as claimed in claim 1, further comprising:
   removing from the display screen the information regarding the one item based on no user touch input being sensed for a predetermined period of time.

7. The method as claimed in claim 1, wherein the sensing the type of the user touch input and the identifying said one item, further comprises:
   identifying a path of user touch input on the display screen; and
   identifying a command which executes a function corresponding to the identified path of the user touch input.

8. The method as claimed in claim 1, wherein the movement by the user comprises an approach by the user and the user touch input is by a part of a body of the user.

9. A display apparatus, comprising:
   a display unit which displays a plurality of items;
   a proximity sensor unit which senses an approach to the display unit by a user, and identifies one item, among the plurality of items, approached by the user;
   a touch sensor unit which senses a type of user touch input by the user to the identified one item; and
   a control unit which displays information regarding different types of user touch comprising at least two of magnifying, reducing, and rotation, wherein the different types of user touch touch control the identified one item, the information is displayed in a size determined based on a distance of the user to the identified one item and the size of the information is changed based on a movement of the user to the identified one item while the information is displayed, and which determines a gesture corresponding to the type of user touch sensed by the touch sensor, and which performs a function comprising at least one of magnifying, reducing, and rotating the item corresponding to the sensed type of user touch among the different types of user touch.

10. The display apparatus as claimed in claim 9, wherein the control unit controls the display unit to remove the information on the display unit corresponding to the one identified item based on no user contact being sensed for a predetermined period of time.

11. The display apparatus as claimed in claim 9, wherein the control unit controls the display unit to remove the information on the display unit corresponding to the one identified item based on a contact by the user being through the touch sensor unit.

12. The display apparatus as claimed in claim 9, wherein the different types of user touch comprise the magnifying, the reducing, and the rotating the identified item.

13. The display apparatus as claimed in claim 9, wherein the different types of user touch comprise a symbol representing a form of each of the different types of user touch input.

14. The display apparatus as claimed in claim 9, wherein the information regarding the action is presented by animation.

15. The display apparatus as claimed in claim 9, wherein the touch sensor unit transmits the information regarding a type of user contact from the different types of user contact to the control unit.

16. The method as claimed in claim 1, wherein the information regarding said different types of user touch for controlling the identified one item further comprises information regarding hand gestures and corresponding functions executed by said hand gestures.

17. The method as claimed in claim 1, wherein the information comprises different types of user touch being displayed in a form of animations or arrows on the display screen of a television.

\* \* \* \* \*